Nov. 24, 1953  C. C. JOLLY  2,660,149
POULTRY FEEDER
Filed April 19, 1951  2 Sheets-Sheet 1
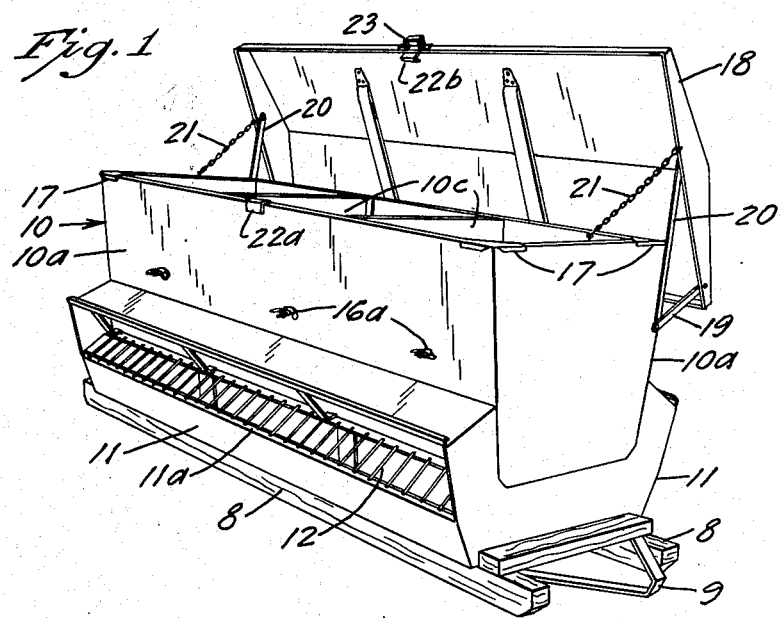
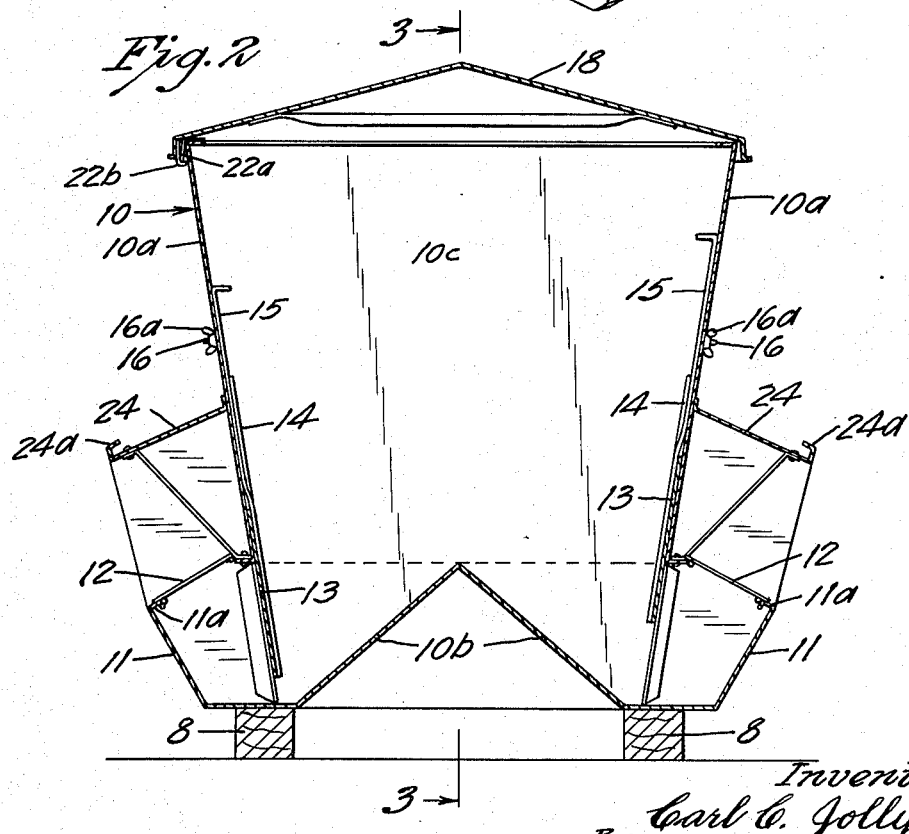
Inventor
Carl C. Jolly
By Williamson & Williamson
Attorneys

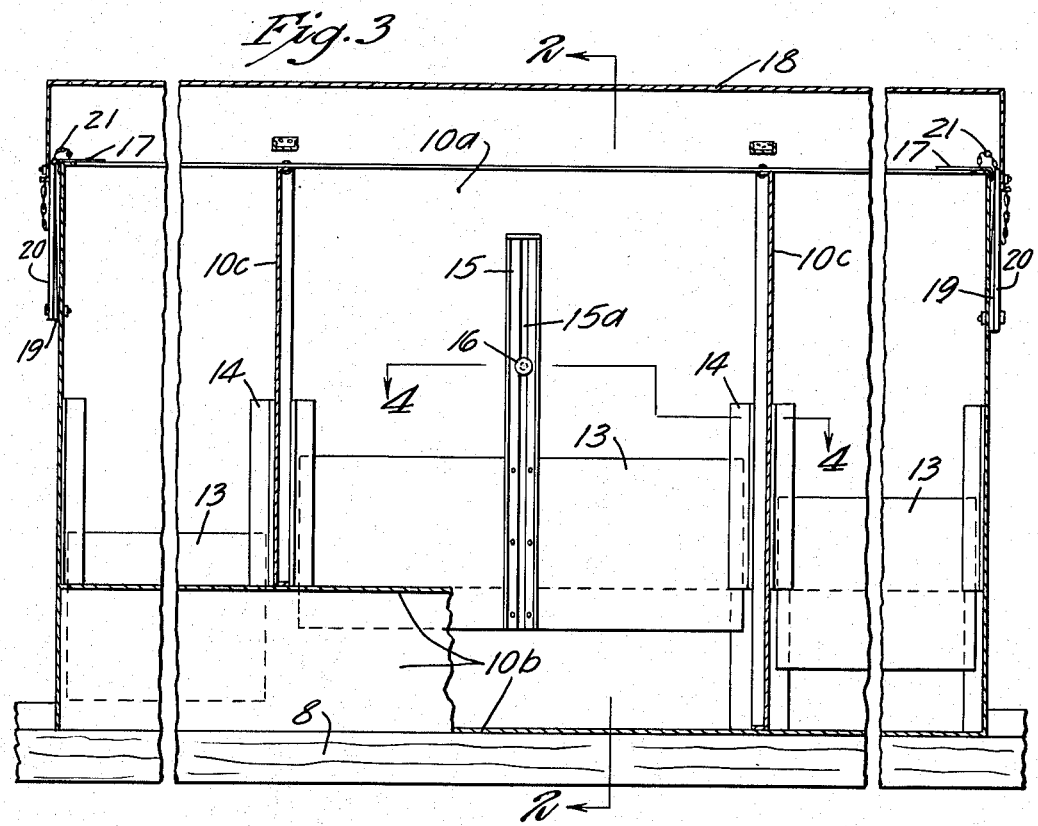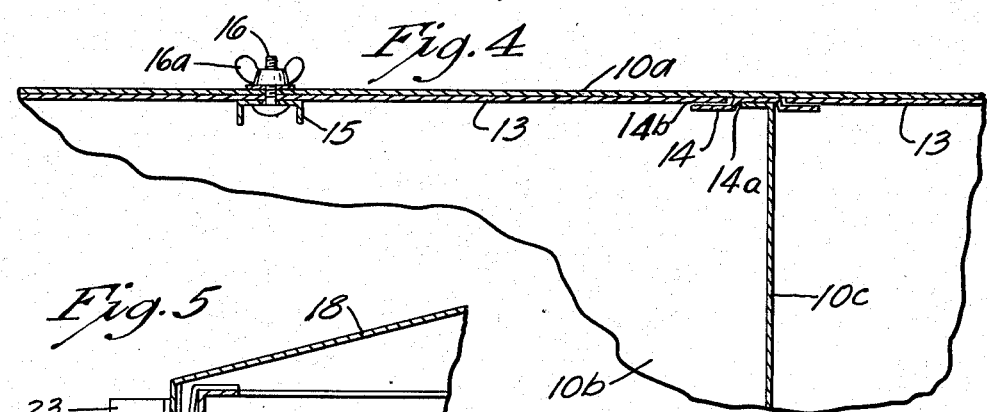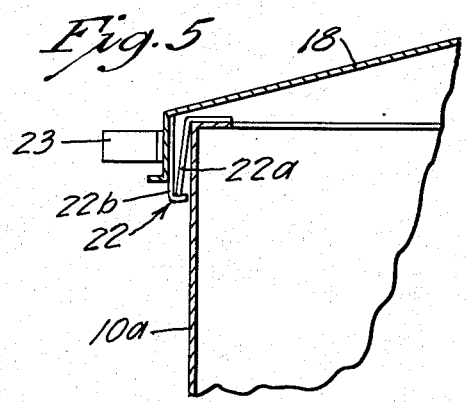

Patented Nov. 24, 1953

2,660,149

UNITED STATES PATENT OFFICE 2,660,149

POULTRY FEEDER

Carl C. Jolly, Owatonna, Minn., assignor to The C. C. Jolly Company, Inc., Owatonna, Minn., a corporation of Minnesota Application April 19, 1951, Serial No. 221,821

2 Claims. (Cl. 119—53)

1

This invention relates generally to poultry feeders and particularly to a bulk turkey feeder.

It is an object of my invention to provide a poultry feeder adapted to be easily moved from one location to another and to contain a large amount of feed material adapted to be controllably released into the feeding troughs thereof, both the troughs and the storage areas being of, both the troughs and the storage areas being constructed to maintain the feed material in a dry condition for long periods of time and also being constructed to prevent wastage of the material by the poultry feeding thereon.

It is another object to provide a bulk poultry feeder having centrally disposed feed storage bins with a cover hingedly mounted thereon and adapted to deliver the feed contained therein selectively to a pair of feed troughs disposed along both sides of said bins and constructed to prevent loss and damage to the feed contained in the entire feeder unit.

More specifically, it is an object to provide a combined feed storage unit and a poultry feeder constructed to provide a number of centrally disposed covered feed storage bins adapted to controllably deliver granular feed material to feeding troughs disposed along the sides of said bins and provided with adjustable means for controlling the flow of feed to said troughs and said entire unit being adapted to be drawn over the ground from one location to another.

Still more specifically, it is an object to provide a combined feed storage and poultry feeder having a central storage unit with the central portion of the bottom thereof being raised and sloping downwardly to the sides to deliver the feed to a pair of feeding troughs disposed along the sides of the storage unit and having a number of shiftable feed discharge control gates to controllably vary the flow of feed from the central bins into the feeding troughs, each of said feeding troughs being protected by an overhanging water shedding eave or gutter and said feed storage unit having a hinged cover mounted thereon to protect the feed stored therein and the entire storage and feeder unit being adapted to be drawn over the ground on a pair of ground engaging members.

It is still a further object to provide a feeding trough adapted to hold the feed in accessible relation while preventing the poultry such as turkeys and the like from scraping the same out of said trough on to the ground by providing an inwardly extending flange having the inner edge thereof bent downwardly to form a feed retaining flange along the upper, outer edge of the trough.

These and other objects and advantages of my invention will more fully appear from the following description made in connection with the accompanying drawings, wherein like reference characters refer to similar parts throughout the several views and in which:

Fig. 1 is a perspective view of my combined feed storage and poultry feeder showing the top in raised position;

Fig. 2 is a transverse vertical sectional view taken substantially along the line 2—2 of Fig. 3;

Fig. 3 is a longitudinal vertical sectional view taken substantially along the line 3—3 of Fig. 2;

Fig. 4 is an enlarged fragmentary horizontal sectional view taken substantially along the line 4—4 of Fig. 3; and Fig. 5 is an enlarged fragmentary transverse vertical sectional view showing the latch mechanism in detail.

As illustrated in the accompanying drawings, I provide a combined feed storage unit and poultry feeder adapted to be moved over the ground surface and in the form shown is provided with a pair of runners 8 on which the entire unit is supported. A draft connection 9 is provided at the front end of said runners with a central storage bin 10 having a number of upstanding dividing partitions 10c formed transversely thereacross to form a number of compartments therein. The side walls 10a of the bin structure 10 terminate a substantial distance above the bottom 10b of said bin structure to provide discharge openings along the sides of the individual compartments. In the form shown, the bottom 10b slopes upwardly from each side to the center to discharge the feed stored in the bin outwardly through the respective discharge openings.

A pair of side troughs 11 are formed along the lower side portions of the bin structure and are positioned to receive the feed discharged through the respective openings. Each of these feeding troughs 11 has a grill work 12 fixed across the open top thereof and the outer upper edge thereof has an anti-waste flange 11a formed therealong which consists in an inwardly extending flange element bent downwardly along the inner extremity thereof to form a depending retaining flange element along said inner edge, as best shown in Fig. 2.

A feed discharge gate 13 is slidably mounted along each side wall of each storage compartment, as best shown in Fig. 3, and controls the flow of granular feed material outwardly through the opening at the bottom edge of the side wall into the trough 11. Suitable guides 14 are formed in fixed relation to said sides 10a as best shown in Fig. 4 and an upstanding adjustment member 15 is fixed to the medial portion of each gate 13 and extends upwardly thereabove with a central slot 15a running the full length thereof. A clamping screw 16 extends through said slot 15a and through an aperture formed in the side wall 10a of the bin structure. A wing nut 16a securely clamps said upstanding member 15 and gate 13 connected therewith in the desired adjusted relation. The guides 14 for the gate 13 are ingeniously formed, as best shown in Fig. 4, from a single elongated strip of sheet material having a depressed center portion 14a into which the side edge flange of the respective partition fits and is securely fixed as by being riveted or welded thereto. A pair of gate receiving guides or grooves 14b are respectively formed on each side of the depressed center portion 14a of each strip 14 and parallel strips thus provide a pair of opposed grooves in which the respective marginal edge portions of the gates 13 are respectively received. Thus, it will be seen that a single strip of sheet material forms two guiding elements as well as a depressed portion 14a into which the respective edge portions of the partitions are received.

The upper corners of the bin structure 10 are reinforced in any conventional manner, such as the corner plates 17 and a top cover 18 is hingedly mounted on said bin structure and extends across the entire top thereof. The pivotal axis for said top is disposed at the rear edge of the bin structure in spaced relation below the top thereof, so that the rear edge of the cover structure 18 is lowered when the top is swung into open position, as shown in Fig. 1. In the form shown, the cover 18 slopes upwardly toward the longitudinal center line thereof to form a gable structure. The hinge for the top is formed from a pair of interconnected braces 19 and 20 at each end of the cover structure, the brace 19 extending substantially vertically when the cover is disposed in closed position and the brace 20 extending diagonally forwardly from the pivot pin mounted in the end of the bin structure. The longer hinge brace 20 raises the front edge of the cover 18 at a faster rate than the shorter rear brace 19 lowers the rear edge of said cover, so that there is sufficient clearance between the top edge of the bin structure 10 and the inside of the cover 18 to permit the same to be easily opened. Suitable means are provided for limiting the swinging movement of the cover 18, such as the flexible chains 21. An extremely simple latch mechanism 22 is provided for retaining the cover in closed position and preventing the wind from blowing the cover open. A flange element 22a is fixed to the front side of the bin structure, and has a free depending portion forming a horizontal locking edge at the bottom thereof. A cooperating locking flange 22b is fixed to the front edge of the top 18, and has an inwardly extending locking flange adapted to be hooked over the lower free edge of the fixed locking flange 22a, as best shown in Figs. 2 and 5. A handle 23 is also provided on the forward edge of the cover 18 adjacent the locking flange 22b and the latch is released by merely pulling outwardly and upwardly on the handle, the metal yields sufficiently to remove the inwardly extending flange from the top locking element 22b from the depending flange 22a.

A protective shield 24 extends along each side 10a of the bin structure 10 in upwardly spaced relation from the top of the respective troughs 11. These shields 24 respectively cover the troughs 11 and prevent rain from running therein, and provide a shelter for the poultry feeding in the trough. An upstanding flange 24a carries the water out to the ends of said shield panel 24.

It will be seen that I have provided an extremely efficient poultry feeder which is combined with a feed storage bin structure, which may be easily transported as a unit from one location to another to facilitate not only the feeding operation but also the filling of the compartments within the bin structure. Each of the compartments has a pair of discharge control gates 13 which respectively adjust the size of the discharge openings on the two sides of the compartments. The latch mechanism for holding the top in closed position is extremely simple and highly efficient for the purpose for which it is intended. The simplified guide construction for the gates is also a relatively efficient and ingenious construction. The anti-waste flange along the outer edge of each of the feeding troughs prevents the poultry from pulling the material out over said edge and provides a considerable saving for the operator of the poultry farm.

It will, of course, be understood that various changes may be made in the form, details, arrangement and proportions of the parts without departing from the scope of my invention.

What I claim is:

1. A poultry feeder comprising an elongated bin structure having a bottom and upstanding sides, a plurality of elongated strips fixed in opposed relation to the respective sides of said bin structure, each of said strips having a depressed center portion engaging the respective sides and fixed thereto and forming a partition receiving groove on each side of the bin, the edge portions of said strip being thus spaced inwardly a slight distance from the adjacent portion of the side to which the depressed center portion is fixed to form a gate receiving guide on each side of said strip, a partition slidably mounted in said opposed grooves formed by said depressed strip portions to securely hold said partitions against shifting movement, said bin sides terminating a slight distance above the bin bottom, and a gate mounted for vertical movement along said sides with the edge portions thereof slidably received in the guides formed by said strips.

2. The structure set forth in claim 1 and clamping means for adjustably locking said gates in the desired raised position.

CARL C. JOLLY.

References Cited in the file of this patent

UNITED STATES PATENTS

| Number | Name | Date |
|---|---|---|
| 1,550,612 | Huber | Aug. 18, 1925 |
| 1,755,532 | Bernard et al. | Apr. 22, 1930 |
| 1,810,782 | Morris | June 16, 1931 |
| 2,116,361 | Nasman | May 3, 1938 |
| 2,362,078 | Lee | Nov. 7, 1944 |
| 2,439,007 | Keithley et al. | Apr. 6, 1948 |
| 2,457,432 | Ballard | Dec. 28, 1948 |